(12) United States Patent
Jiang et al.

(10) Patent No.: US 11,886,730 B2
(45) Date of Patent: Jan. 30, 2024

(54) COMPRESSION RATIO-AWARE DATA DEDUPLICATION

(71) Applicant: Dell Products L.P., Round Rock, TX (US)

(72) Inventors: Changxu Jiang, Chengdu (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/852,927

(22) Filed: Jun. 29, 2022

(65) Prior Publication Data

US 2023/0409223 A1     Dec. 21, 2023

(30) Foreign Application Priority Data

Jun. 15, 2022   (CN) .......................... 202210681291.X

(51) Int. Cl.
   *G06F 3/00*     (2006.01)
   *G06F 3/06*     (2006.01)

(52) U.S. Cl.
   CPC .......... *G06F 3/0641* (2013.01); *G06F 3/0604* (2013.01); *G06F 3/067* (2013.01); *G06F 3/0631* (2013.01); *G06F 3/0689* (2013.01)

(58) Field of Classification Search
   CPC .... G06F 3/0641; G06F 3/0604; G06F 3/0631; G06F 3/067; G06F 3/0689
   See application file for complete search history.

(56) References Cited

U.S. PATENT DOCUMENTS

| 2014/0115258 A1* | 4/2014 | Week | G06F 16/1752 |
| | | | 711/163 |
| 2014/0281302 A1* | 9/2014 | Horn | G06F 3/0659 |
| | | | 711/161 |
| 2018/0246649 A1* | 8/2018 | Datar | H03M 7/3091 |
| 2020/0341670 A1* | 10/2020 | Zhang | G06F 3/0631 |

(Continued)

OTHER PUBLICATIONS

NVM Express, "NVM Express Base Specification, Revision 2.0a," NVM Express, Jul. 23, 2021, 454 pages.

(Continued)

*Primary Examiner* — Craig S Goldschmidt
(74) *Attorney, Agent, or Firm* — Ryan, Mason & Lewis, LLP

(57) ABSTRACT

An apparatus comprises a processing device configured to maintain a deduplication data structure comprising sub-portions associated with different compression ratio ranges and having different numbers of data block identifiers. The processing device is also configured to identify a given data block identifier and a given compression ratio for a given data block to be stored, and to determine whether the given data block identifier is in a given one of the sub-portions having a given compression ratio range including the given compression ratio. The processing device is further configured, responsive to determining that the given data block identifier is not in the given sub-portion, to write the given data block to a physical space block of the storage system and, responsive to determining that the given data block identifier is in the given sub-portion, to increment a deduplication reference count for the given data block identifier.

20 Claims, 17 Drawing Sheets

(56) References Cited

U.S. PATENT DOCUMENTS

2021/0109900 A1* 4/2021 McIlroy .............. G06F 16/1752

OTHER PUBLICATIONS

Dell Technologies, "APEX Data Storage Services," Solution Brief, May 2022, 2 pages.
Dell Technologies, "Dell EMC PowerStore," Data Sheet H18234, Apr. 2020, 4 pages.
Dell Technologies, "Dell EMC PowerStore Storage Family," Spec Sheet H18143.19, Jun. 2022, 8 pages.
J. Wei et al., "Multimodal Content Defined Chunking for Data Deduplication," Huawei Technologies, Feb. 2014, 2 pages.
R. F. Olanrewaju et al., "A Study on Performance Evaluation of Conventional Cache Replacement Algorithms: A Review," Fourth International Conference on Parallel, Distributed and Grid Computing, Dec. 2016, pp. 550-556.
Q. He et al., "Data Deduplication Techniques," International Conference on Future Information Technology and Management Engineering, Dec. 3, 2010, pp. 430-433.

* cited by examiner

DATA FOLLOWING COMPRESSION
310-2

DEDUPLICATION HASH ENTRIES
308-2

DATA TO BE COMPRESSED
306

US 11,886,730 B2

COMPRESSION RATIO-AWARE DATA DEDUPLICATION

RELATED APPLICATION

The present application claims priority to Chinese Patent Application No. 202210681291.X, filed on Jun. 15, 2022 and entitled "Compression Ratio-Aware Data Deduplication," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for compression ratio-aware data deduplication.

In one embodiment, an apparatus comprises at least one processing device comprising a processor coupled to a memory. The at least one processing device is configured to perform the step of maintaining, for a storage system, a deduplication data structure comprising data block identifiers, the deduplication data structure comprising two or more sub-portions associated with different compression ratio ranges, the two or more sub-portions of the deduplication data structure having different numbers of data block identifiers. The at least one processing device is also configured to perform the steps of identifying, for a given data block to be stored in the storage system, a given data block identifier and a given compression ratio and determining whether the given data block identifier of the given data block is in a given one of the two or more sub-portions of the deduplication data structure having a given compression ratio range including the given compression ratio. The at least one processing device is further configured to perform the step of, responsive to determining that the given data block identifier for the given data block is not in the given sub-portion of the deduplication data structure, writing the given data block to a given one of a plurality of physical space blocks of the storage system, the given physical space block being selected based at least in part on the given compression ratio of the given data block and an amount of unused space in the given physical space block. The at least one processing device is further configured to perform the step of, responsive to determining that the given data block identifier for the given data block is in the given sub-portion of the deduplication data structure, incrementing a deduplication reference count for the given data block identifier.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
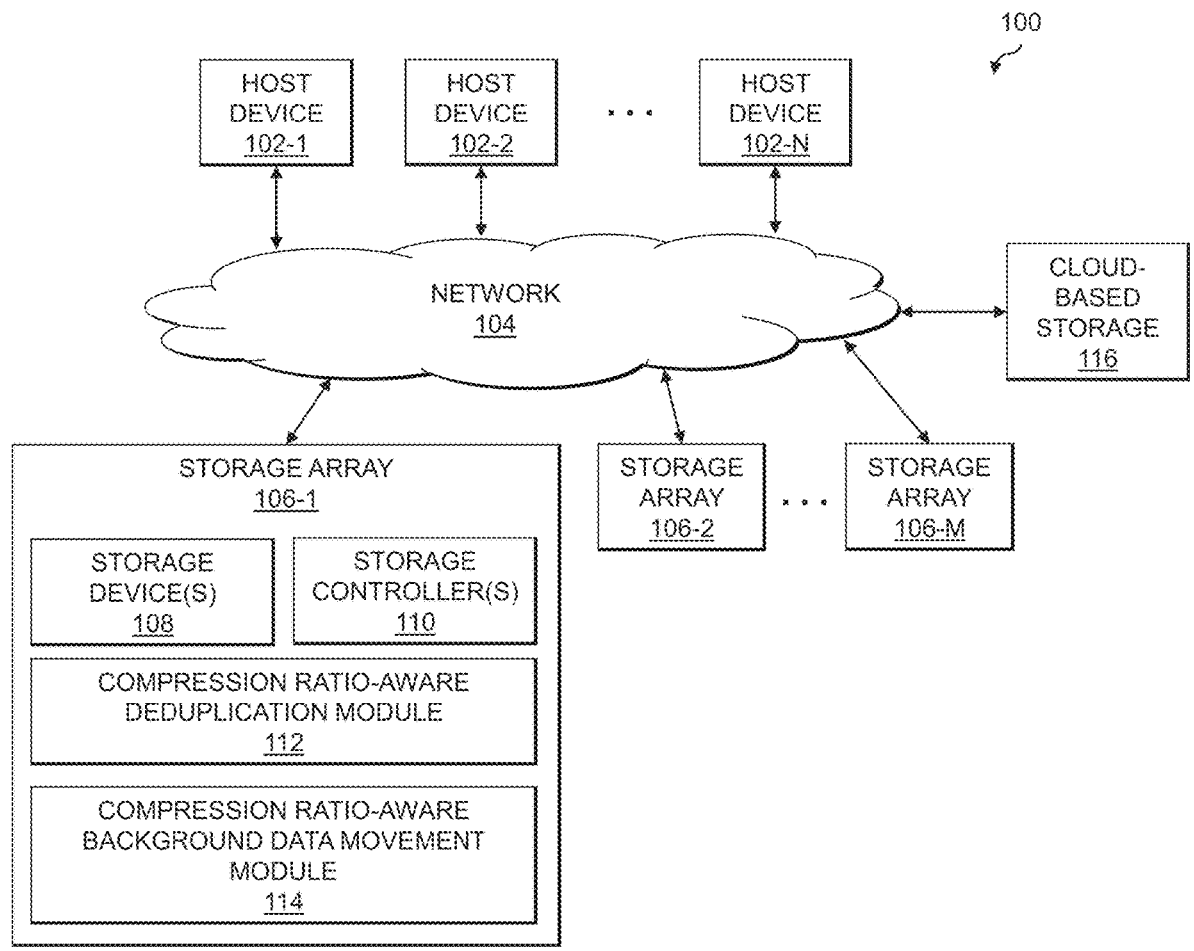
FIG. 1 is a block diagram of an information processing system for compression ratio-aware data deduplication in an illustrative embodiment.

FIG. 1 shows an information processing system 100 configured in accordance with an illustrative embodiment to provide functionality for compression ratio-aware data deduplication. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM), magnetic RAM (MRAM), resistive RAM (RRAM), etc. These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108. In some embodiments, the storage array 106-1 is assumed to comprise a persistent memory that is implemented using a flash memory or other type of non-volatile memory of the storage array 106-1. The persistent memory is further assumed to be separate from the storage devices 108 of the storage array 106-1, although in other embodiments the persistent memory may be implemented as a designated portion or portions of one or more of the storage devices 108.

In some embodiments, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster. Different ones of the storage arrays 106 may be associated with different sites. For example, the storage array 106-1 may be at a first site while the storage array 106-2 may be at a second site that is potentially geographically remote from the first site.

At least one of the storage controllers of the storage arrays 106 (e.g., the storage controller 110 of storage array 106-1) is assumed to implement functionality for improving storage space usage efficiency (e.g., across the storage devices 108 of the storage array 106-1, across multiple ones of the storage arrays 106 that are part of a storage cluster, between a storage cluster comprising two or more of the storage arrays 106 and one or more external storage systems such as cloud-based storage 116, etc.) using techniques for deduplication and background data movement which are compression ratio-aware. Such functionality is provided via a compression ratio-aware deduplication module 112 and a compression ratio-aware background data movement module 114.

The compression ratio-aware deduplication module 112 is configured to maintain, for the storage array 106-1 (or a storage cluster including the storage array 106-1 and one or more other ones of the storage arrays 106), a deduplication data structure comprising data block identifiers. The deduplication data structure (e.g., a deduplication hash table) comprises two or more sub-portions (e.g., sub-tables) associated with different compression ratio ranges. The two or more sub-portions of the deduplication data structure have different numbers of data block identifiers. The compression ratio-aware deduplication module 112 is also configured to identify, for a given data block to be stored, a given data block identifier and a given compression ratio. The compression ratio-aware deduplication module 112 is further configured to determine whether the given data block identifier of the given data block is in a given one of the two or more sub-portions of the deduplication data structure having a given compression ratio range including the given compression ratio. Responsive to determining that the given data block identifier for the given data block is not in the given sub-portion of the deduplication data structure, the compression ratio-aware deduplication module 112 is configured to write the given data block to a given one of a plurality of physical space blocks of the storage system. The given physical space block is selected based at least in part on the given compression ratio of the given data block and an amount of unused space in the given physical space block. Responsive to determining that the given data block identifier for the given data block is in the given sub-portion of the deduplication data structure, the compression ratio-aware deduplication module 112 is configured to increment a deduplication reference count for the given data block identifier.

The compression ratio-aware background data movement module 114 is configured, responsive to determining that an amount of unused space of the given physical space block exceeds a designated threshold, to perform a background data copy operation to reduce the amount of unused space of the given physical space block. The storage system may comprise a plurality of virtual logical blocks that map logical data blocks to physical space of the plurality of physical space blocks. The given physical space block may be limited to mapping a designated number of the plurality of virtual logical blocks. The background data copy operation comprises migrating a first one of the plurality of virtual logical blocks currently mapped to the given physical space block to another one of the plurality of physical space blocks, and allocating a second one of the plurality of virtual logical blocks to the given physical space block. The first virtual logical block maps a first logical data block having a first compression ratio and the second virtual logical block maps a second logical data block having a second compression ratio. The second compression ratio is lower than the first compression ratio.

Although in the FIG. 1 embodiment the compression ratio-aware deduplication module 112 and the compression ratio-aware background data movement module 114 are shown as being implemented internal to the storage array 106-1 and outside the storage controllers 110, in other embodiments one or both of the compression ratio-aware deduplication module 112 and the compression ratio-aware background data movement module 114 may be implemented at least partially internal to the storage controllers 110 or at least partially outside the storage array 106-1, such as on one of the host devices 102, on one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the compression ratio-aware deduplication module 112 and the compression ratio-aware background data movement module 114.

At least portions of the functionality of the compression ratio-aware deduplication module 112 and the compression ratio-aware background data movement module 114 may be implemented at least in part in the form of software that is stored in memory and executed by a processor.

As noted above, the storage arrays 106 in some embodiments are assumed to be part of a storage cluster. The storage cluster may provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 2.0a, July 2021, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 13 and 14.

It is to be understood that the particular set of elements shown in FIG. 1 for compression ratio-aware data deduplication is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for compression ratio-aware data deduplication will now be described in more detail with reference to the flow diagram of FIG. 2. It is to be understood that this particular process is only an example, and that additional or alternative processes for compression ratio-aware data deduplication may be used in other embodiments.

In this embodiment, the process includes steps 200 through 208. These steps are assumed to be performed by the compression ratio-aware deduplication module 112 and the compression ratio-aware background data movement module 114. The process begins with step 200, maintaining, for a storage system, a deduplication data structure comprising data block identifiers. The deduplication data structure comprises two or more sub-portions associated with different compression ratio ranges. The two or more sub-portions of the deduplication data structure have different numbers of data block identifiers. In step 202, a given data block identifier and a given compression ratio are identified for a given data block to be stored in the storage system.

Figure 2:
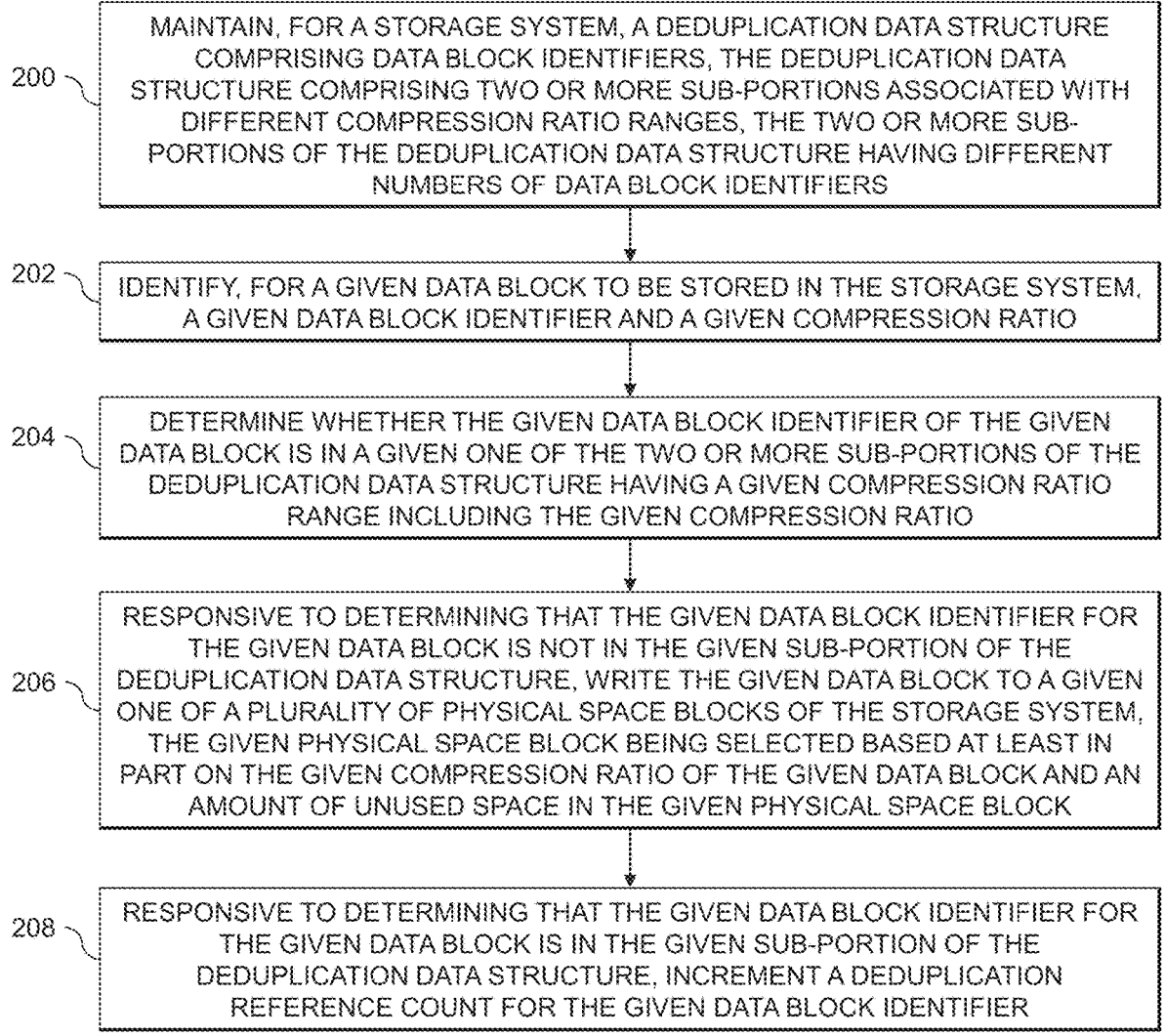
FIG. 2 is a flow diagram of an exemplary process for compression ratio-aware data deduplication in an illustrative embodiment.

The FIG. 2 process continues with step 204, determining whether the given data block identifier of the given data block is in a given one of the two or more sub-portions of the deduplication data structure having a given compression ratio range including the given compression ratio. Responsive to determining that the given data block identifier for the given data block is not in the given sub-portion of the deduplication data structure, the given data block is written to a given one of a plurality of physical space blocks of the storage system in step 206. The given physical space block being selected based at least in part on the given compression ratio of the given data block and an amount of unused space in the given physical space block. Responsive to determining that the given data block identifier for the given data block is in the given sub-portion of the deduplication data structure, a deduplication reference count for the given data block identifier is incremented in step 208.

The deduplication data structure may comprise a deduplication hash table, and the data block identifiers comprise hashes of content of data blocks. Each of the two or more sub-portions of the deduplication data structure may have a target length computed based at least in part on its associated compression ratio range.

Step 200 may comprise, responsive to receiving a new data block identifier associated with a new data block for addition to the deduplication data structure, determining whether the deduplication data structure has available space for the new data block identifier. Determining whether the deduplication data structure has available space for the new data block identifier may comprise determining whether a sum of data block identifiers across the two or more sub-portions of the deduplication data structure is less than a target total number of data block identifiers for the deduplication data structure. Responsive to determining that the deduplication data structure has available space for the new data block identifier, a compression ratio of the new data block is identified and the new data block identifier is added to one of the two or more sub-portions of the deduplication data structure having an associated compression ratio range including the identified compression ratio of the new data block.

Responsive to determining that the deduplication data structure does not have available space for the new data block identifier, one or more existing data block identifiers are evicted from the deduplication data structure and the new data block identifier is added to one of the two or more sub-portions of the deduplication data structure having an associated compression ratio range including the identified compression ratio of the new data block. Each of the two or more sub-portions of the deduplication data structure may have a target length computed based at least in part on its associated compression ratio range, and evicting the one or more existing data block identifiers from the deduplication data structure may comprise evicting the one or more existing data block identifiers from ones of the two or more sub-portions of the deduplication data structure having numbers of entries exceeding their associated target lengths. Evicting the one or more existing data block identifiers from the deduplication data structure may comprise evicting the one or more existing data block identifiers from ones of the two or more sub-portions of the deduplication data structure having numbers of entries exceeding their associated target lengths that are one of least recently used and least frequently used.

The FIG. 2 process may further include, responsive to determining that an amount of unused space of the given physical space block exceeds a designated threshold, performing a background data copy operation to reduce the amount of unused space of the given physical space block. The storage system may comprise a plurality of virtual logical blocks that map logical data blocks to physical space of the plurality of physical space blocks. The given physical space block may be limited to mapping a designated number of the plurality of virtual logical blocks. The background data copy operation may comprises migrating a first one of the plurality of virtual logical blocks currently mapped to the given physical space block to another one of the plurality of physical space blocks, and allocating a second one of the plurality of virtual logical blocks to the given physical space block. The first virtual logical block maps a first logical data block having a first compression ratio and the second virtual logical block maps a second logical data block having a second compression ratio. The second compression ratio is lower than the first compression ratio.

Compression and deduplication are two techniques that can provide significant space savings in storage systems. Compression aims to limit the amount of storage capacity that is used by reducing the actual size of data that is stored. Deduplication reduces the amount of storage capacity that is used by limiting identical data sets that consume storage space to a single (or fewer) instances. A deduplication approach may break data into small chunks, and assign each chunk a unique identifier (e.g., a unique hash identifier). Deduplication approaches may utilize inline deduplication and/or post deduplication. Inline deduplication is performed during transfer of data to storage, where the deduplication algorithm checks the hash identifier to see if it already exists in storage. If the hash identifier exists, the new copy is not stored in the physical storage. Inline deduplication, however, is hard to perform for all incoming data blocks without affecting performance. Post deduplication is performed after data is already written to storage without deduplication, where data is read out from the physical storage to check if its hash identifier already exists in storage. If it does, that data is not stored on the physical storage.

Deduplication approaches utilize a deduplication hash table (e.g., in a deduplication cache) that is used to store the identifiers (e.g., hash identifiers) of data blocks. Only data blocks whose identifiers "hit" an entry in the deduplication hash table have the chance to be deduplicated (deduped). The number of hash entries, however, is limited since the size of the deduplication hash table is limited for performance and memory considerations. To improve deduplication efficiency, the technical solutions described herein optimize or improve a cache replacement or eviction algorithm to only keep high deduplication probability level entries in the deduplication hash table.

In some embodiments, the characteristics of compression ratios of different data blocks impact on storage system efficiency is considered to improve storage system efficiency (e.g., to make full or improved use of storage space). There are various technical problems that keep storage systems from making full use of available storage space, including: (1) compression ratios of data blocks that have entries in a deduplication hash table impact data deduplication efficiency; and (2) storage systems may report out of space conditions, but storage space utilization may be less than 100% when workloads have data that can be compressed more than some designated threshold (e.g., more than 8:1) such that there is a need for mitigation actions to alleviate wasted unusable space.

Figure 3A:
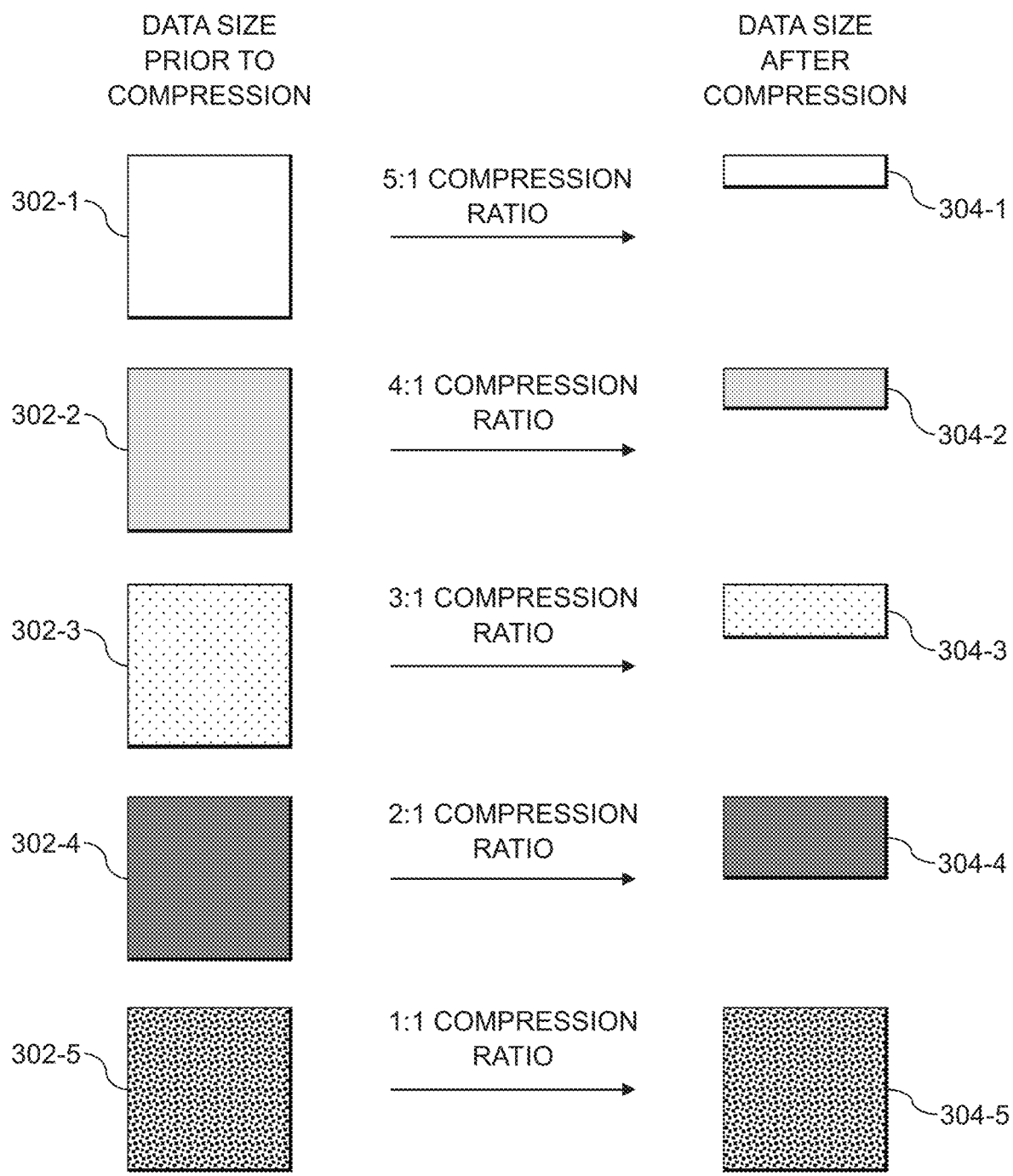
FIGS. 3A-3C show compression of data blocks having different compression ratios using different hash entries in a deduplication hash table in an illustrative embodiment.

With regard to technical problem (1), it is difficult to retain deduplication hash table entries for all data blocks as the size of a deduplication hash table may be limited. In some cases, data deduplication is used in conjunction with data compression to save storage space. The compression ratio values of deduplicatable (dedupable) data blocks may vary. To describe how data compression ratios can affect deduplication through retention of entries in a deduplication hash table, five types of data blocks with different compression rates (e.g., 5:1, 4:1, 3:1, 2:1, 1:1) are considered as an example. FIG. 3A shows data blocks 302-1, 302-2, 302-3, 302-4 and 302-5 (collectively, data blocks 302) having such different compression ratios, illustrating the data blocks 302 associated sizes prior to compression. FIG. 3A also shows data sizes for the data blocks 302 after compression, visualized as compressed data blocks 304-1, 304-2, 304-3, 304-4 and 304-5 (collectively, compressed data blocks 304).

Figure 3B:
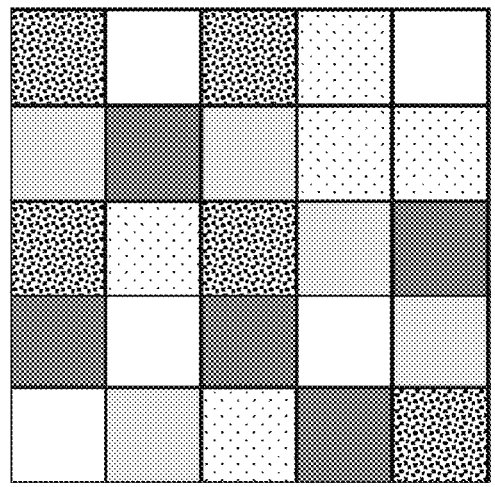
Figure 3B:
Figure 3B:
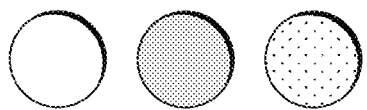
Figure 3B:
Figure 3B:
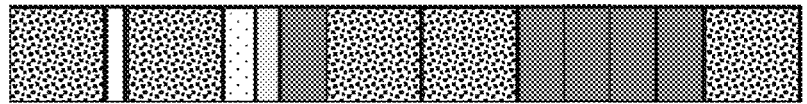
Figure 3C:
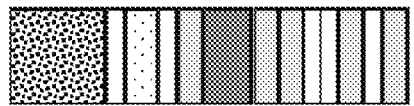
Figure 3C:
Figure 3C:
Figure 3C:
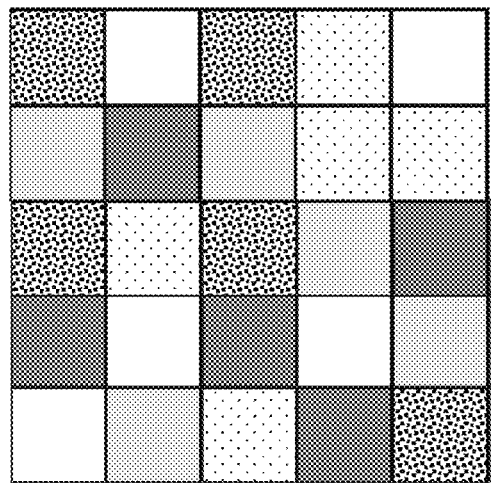

To remove the influence of other factors, the data blocks 302 are assumed to have equal dedupable probability levels (e.g., the data blocks 302 have an equal chance to be deduplicated). FIGS. 3B and 3C show a set of data to be compressed 306 that includes multiple instances of each of the data blocks 302. In both the FIG. 3B and FIG. 3C examples, it is assumed that the deduplication hash table is limited to three entries. For FIG. 3B, the deduplication hash entries 308-1 are for data blocks 302-1, 302-2 and 302-3. For FIG. 3C, the deduplication hash entries 308-2 are for data blocks 302-3, 302-4 and 302-5. Thus, the deduplication hash entries 308-1 and 308-2 are for ones of the data blocks 302 with different compression ratios, which means that the only factor which has an influence on the size of the compressed data is the compression ratios of the data blocks 302. As shown in FIGS. 3B and 3C, the data following compression 310-1 using the deduplication hash entries 308-1 is greater than the data following compression 310-2 using the deduplication hash entries 308-2. The data following compression 310-1 and 310-2 illustrate the data on disk after compression, or how much physical space is needed to store the set of data to be compressed 306, which includes both deduplicated and non-deduplicated blocks (e.g., as per the deduplication hash entries 308-1 and 308-2). Although in the examples of FIGS. 3B and 3C, the deduplication hash entries 308-1 and 308-2 have the same deduplication hit rate, the allocated physical space for the data following compression 310-2 is reduced compared to the data following compression 310-1, which means that the deduplicated space of the data following compression 310-2 is more than that of the data following compression 310-1. FIGS. 3B and 3C thus illustrate that retaining lower compression ratio data blocks in a deduplication hash table can help improve deduplication efficiency when data blocks have equal dedupable probability level.

Figure 4:
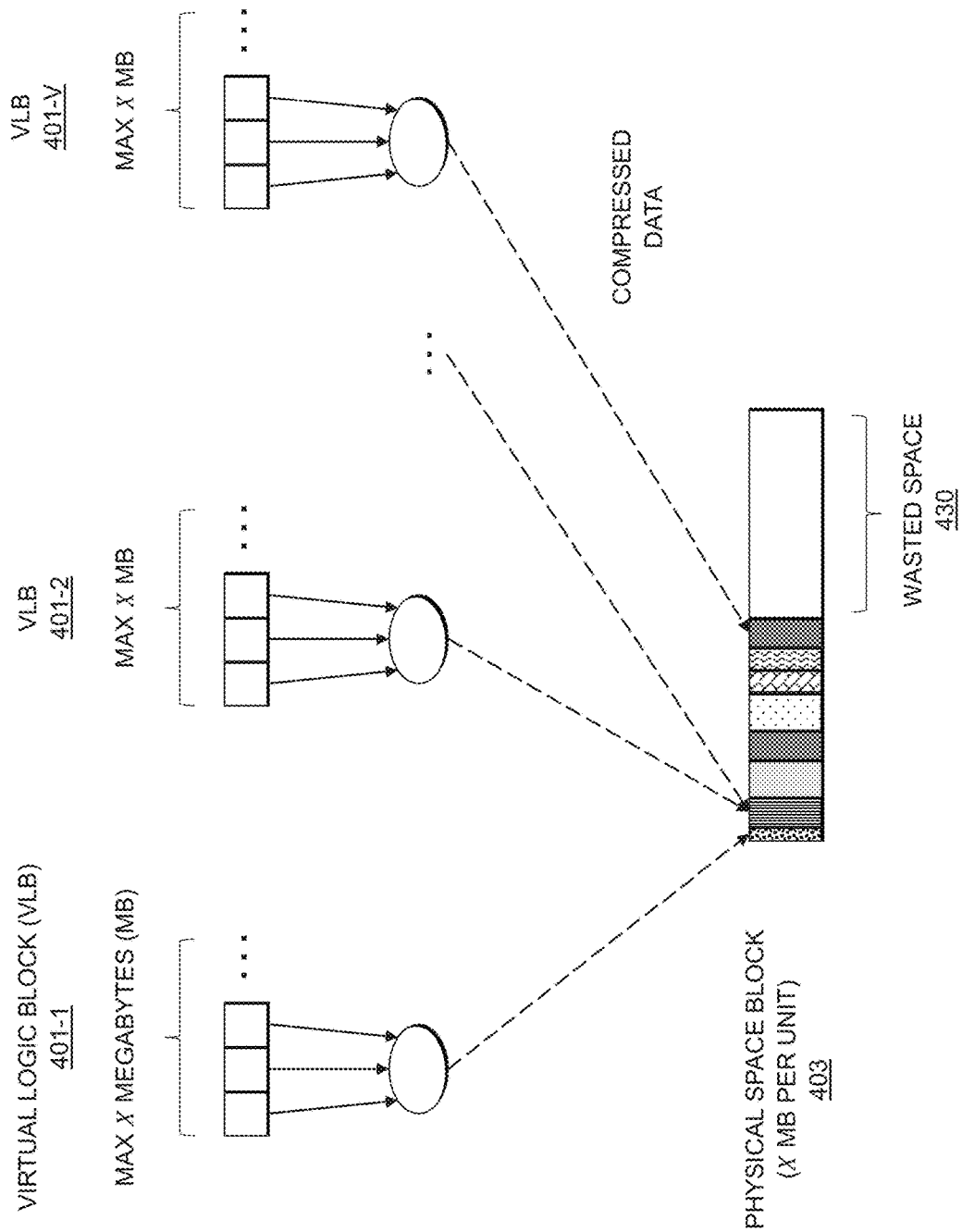
FIG. 4 shows an example of wasted space when mapping virtual logic blocks to a physical space block in an illustrative embodiment.

With regard to technical problem (2), a storage system may utilize virtual entries to map logical space to physical space when implementing data reduction features. Multiple virtual entries may be located in one virtual logical block (VLB), and multiple VLBs can refer to one unit of physical space (e.g., one physical space block). However, the number of VLBs that may be mapped to one physical space block may be limited by the storage system as a larger number would cause VLB waste (e.g., metadata space wastage), and make implementation more complicated while a smaller number would cause physical space waste (e.g., user data space). In various embodiments described below, it is assumed that the limit is 8:1 (e.g., 8 VLBs can refer to one physical space block). In some cases, the storage system may report an "out of space" condition where space utilization is less than 100% when workloads have data that can be compressed more than 8:1. FIG. 4 shows an example of such an implementation, with a set of VLBs 401-1, 401-2, . . . 401-V (collectively, VLBs 401) which map to the same physical space block 403. Here, V is assumed to be 8. Each of the VLBs 401 has a maximum data X in megabytes (MB), and the physical space block 403 also has X MB per unit. In the FIG. 4 example, the physical space block 403 has already been referenced by the maximum number of VLBs 401 (e.g., 8 VLBs), and the compressed data has a compression ratio greater than 8:1 which causes the physical space block 403 to have unusable wasted space 430 that no new user data can be written to.

Illustrative embodiments overcome the above technical problems through adaptive use of variable-length sub-tables within a deduplication hash table, where the sub-tables leverage data block compression ratio awareness. Entries with identifiers of lower compression ratio data blocks are thus given a higher chance to be retained in the deduplication hash table. This further reduces capacity demands for a storage system to store the same amount of data. The optimizations described herein can help make full or improved use of physical space, through allocation of lower compression ratio data block copies to previously unusable wasted space via background data copy operations. Division based on compression ratio levels, and the constraint of grouping entries with optimal length based on compression ratio levels, provide a novel approach which is effective when used to optimize deduplication hash table retention and eviction policies. This provides corresponding improvements in storage space usage efficiency. Advantageously, the techniques described herein are lightweight, and leverage suitably modified cache retention and eviction algorithms for deduplication cache table entries to separate the cache entries with higher dedupability from cache entries with lower dedupability. In other words, the cache retention and eviction algorithms are modified to let lower compression ratio data blocks have a higher chance to be retained in the deduplication hash table to improve storage space usage efficiency.

Figure 5:
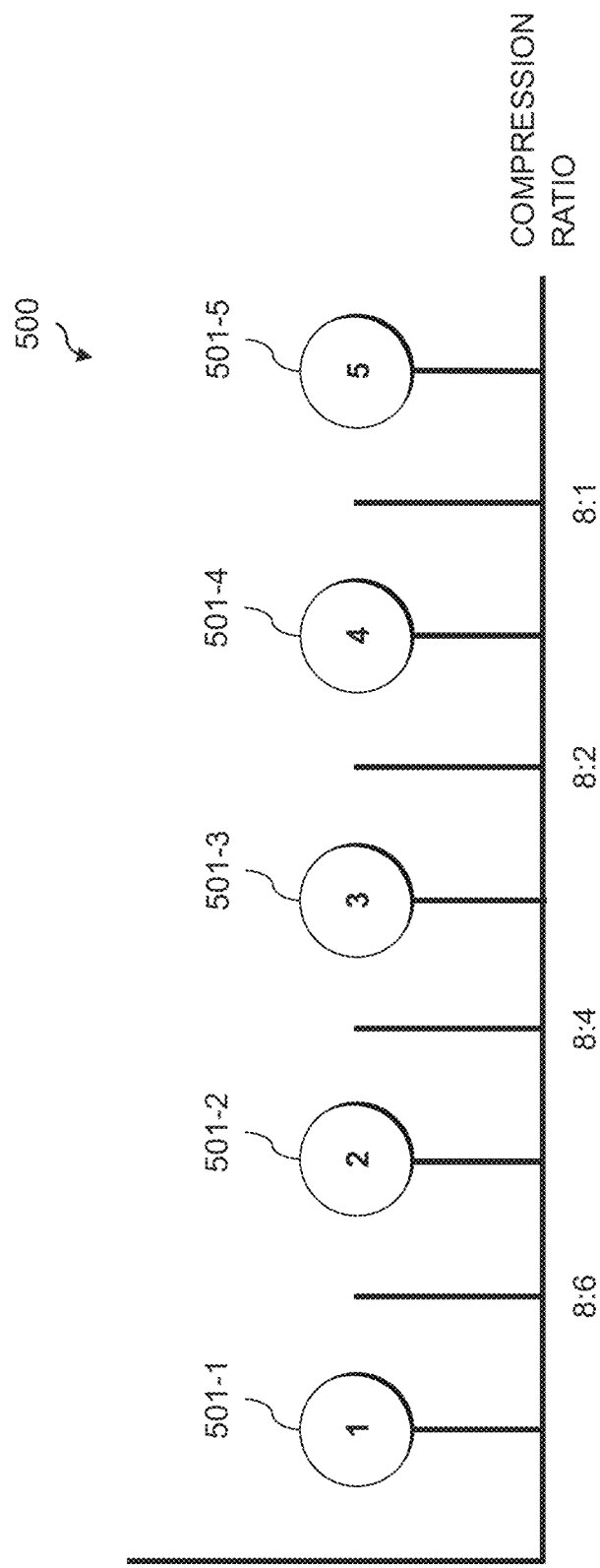
FIG. 5 shows an example of different compression ratio levels used for splitting a deduplication hash table into multiple sub-tables in an illustrative embodiment.

In some embodiments, a deduplication hash table is divided into multiple sub-tables with variable length based on data blocks' actual consumed physical space (e.g., which may be generally determined by the data compression ratios of the data blocks). FIG. 5 shows an example 500 of such division, where data block compression ratios are divided into five levels 501-1, 501-2, 501-3, 501-4 and 501-5. With division of compression ratio levels for data blocks, two optimization points are provided to address the technical problems (1) and (2) described above within the process flow 600 of FIG. 6. In the process flow 600, incoming data blocks to be written are received in step 601, followed by data deduplication in step 602A. The data deduplication step 602A provides a first optimization point via step 602B, where deduplication hash table cache entry retention and eviction algorithms are optimized with consideration of the technical problem (2) described above. In step 603, data blocks that do not "hit" cache entries in the deduplication hash table are identified, and in step 604A such data blocks are written to physical space. The physical space writing step 604A provides a second optimization point via step 604B, where physical space block selection is optimized with consideration of the technical problem (1) described above. In step 605, cache entries in the deduplication hash table are updated.

In the description below, the following notation is utilized:

$C$ is used to denote a data block's compression ratio, where $C = \text{size\_original}/\text{size\_after\_compressed}$;

length_total is used to denote the maximum number of hash table entries for deduplication;

subtable_c[1] is used to denote a deduplication hash sub-table which includes identifiers of data blocks with a level 1 compression ratio $C$ (level 501-1 in the FIG. 5 example), where $C \leq 8:6$;

subtable_c[2] is used to denote a deduplication hash sub-table which includes identifiers of data blocks with a level 2 compression ratio C (level 501-2 in the FIG. 5 example), where 8:6<C≤8:4;

subtable_c[3] is used to denote a deduplication hash sub-table which includes identifiers of data blocks with a level 3 compression ratio C (level 501-3 in the FIG. 5 example), where 8:4<C≤8:2;

subtable_c[4] is used to denote a deduplication hash sub-table which includes identifiers of data blocks with a level 4 compression ratio C (level 501-4 in the FIG. 5 example), where 8:2<C≤8:1;

subtable_c[5] is used to denote a deduplication hash sub-table which includes identifiers of data blocks with a level 5 compression ratio C (level 501-5 in the FIG. 5 example), where C>8:1;

$L[1]_{optimal}$ is used to denote the target length of subtable_c [1], which is the optimal number of entries in subtable_c[1], where $$L[1]_{optimal} = \text{int}\left(\text{length\_total} * \frac{8+7}{1+\sum_{i \in \{1,2,\ldots,8\}} i}\right);$$

$L[2]_{optimal}$ is used to denote the target length of subtable_c [2], which is the optimal number of entries in subtable_c[2], where $$L[2]_{optimal} = \text{int}\left(\text{length\_total} * \frac{6+5}{1+\sum_{i \in \{1,2,\ldots,8\}} i}\right);$$

$L[3]_{optimal}$ is used to denote the target length of subtable_c [3], which is the optimal number of entries in subtable_c[3], where $$L[3]_{optimal} = \text{int}\left(\text{length\_total} * \frac{4+3}{1+\sum_{i \in \{1,2,\ldots,8\}} i}\right);$$

$L[4]_{optimal}$ is used to denote the target length of subtable_c [4], which is the optimal number of entries in subtable_c [4], where $$L[4]_{optimal} = \text{int}\left(\text{length\_total} * \frac{2+1}{1+\sum_{i \in \{1,2,\ldots,8\}} i}\right);$$

$L[5]_{optimal}$ is used to denote the target length of subtable_c [5], which is the optimal number of entries in subtable_c[5], where $$L[5]_{optimal} = \text{int}\left(\text{length\_total} * \frac{1}{1+\sum_{i \in \{1,2,\ldots,8\}} i}\right);$$

L is used to denote one list to record the actual length of each sub-table, where L[n] is the number of entries for subtable_c[n]; and M is used to denote a variable number used in a deduplication hash table entry eviction algorithm.

Figure 6:
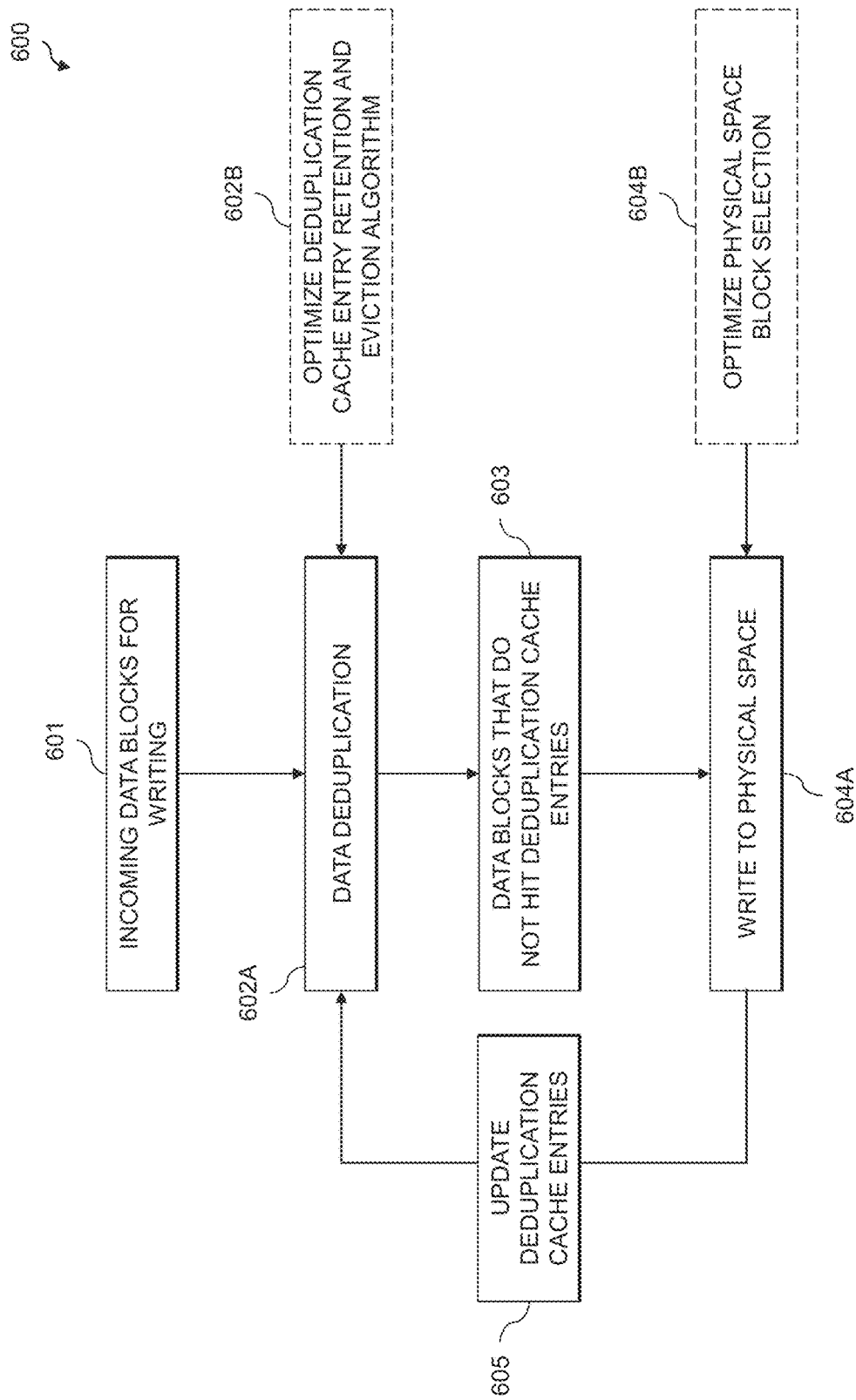
FIG. 6 shows a process flow for deduplication data that is written to a storage system utilizing optimization of deduplication hash table retention and eviction algorithms as well as optimization of physical space block selection in an illustrative embodiment.
Figure 7:
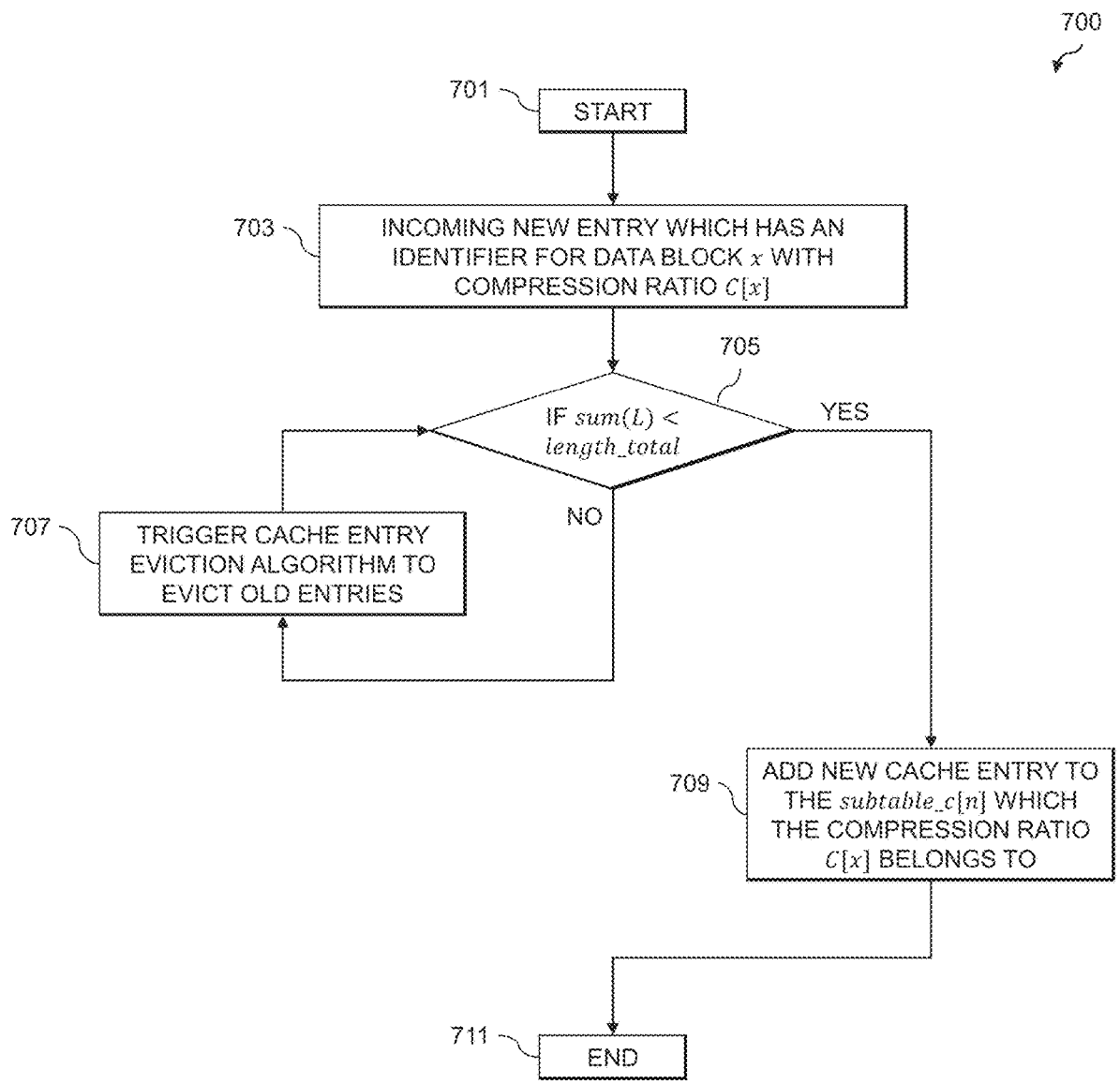
FIG. 7 shows a process flow for adding cache entries to a deduplication hash table in an illustrative embodiment.
Figure 8:
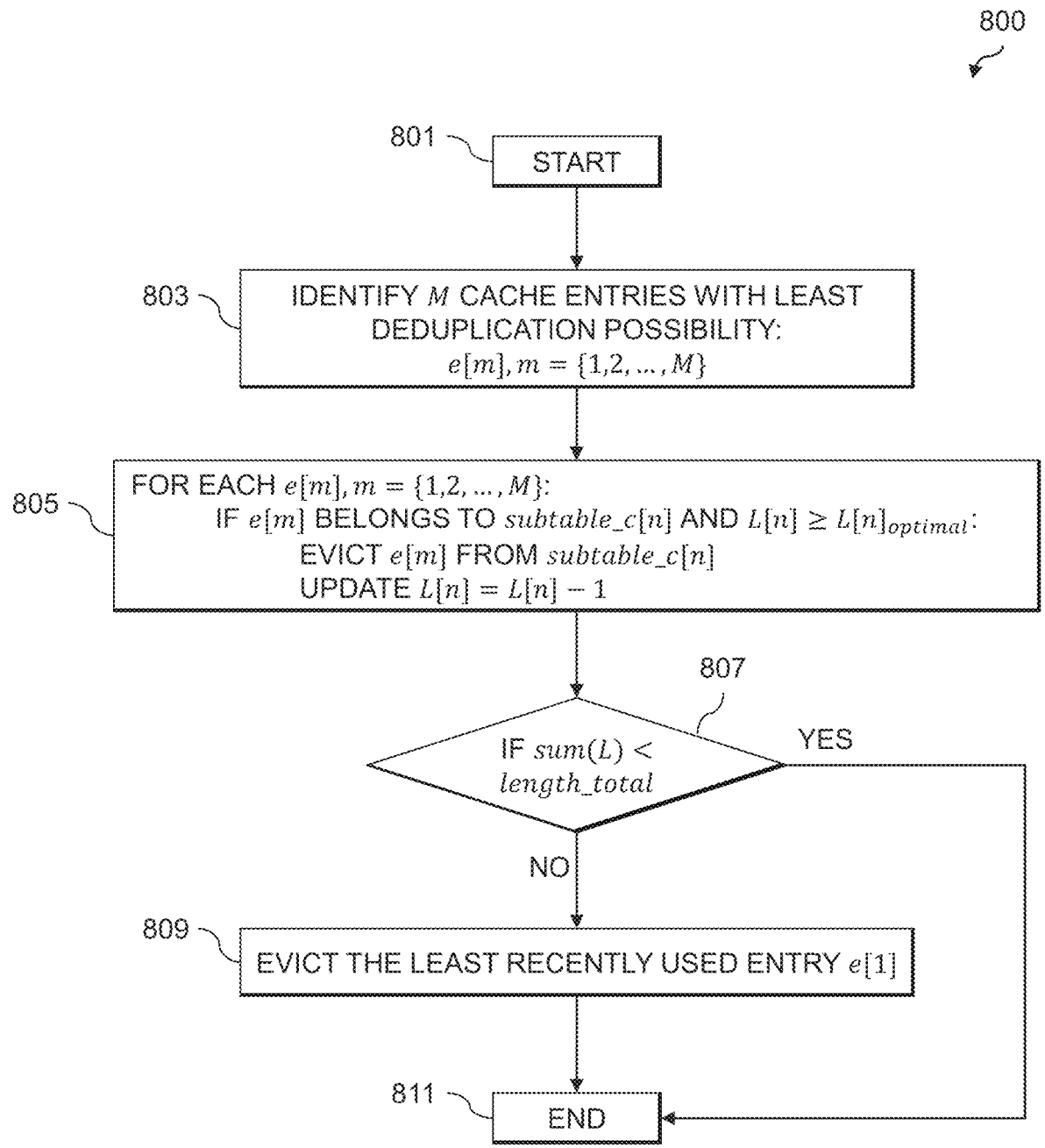
FIG. 8 shows a process flow for removing cache entries from a deduplication hash table in an illustrative embodiment.

Optimization of deduplication hash table entry retention and eviction algorithms with consideration of the technical problem (1) above (e.g., the optimization point of step 604B in the process flow 600 of FIG. 6) will now be described. In some embodiments, a retention and eviction algorithm for deduplication hash table cache entries is used to separate the cache entries with higher dedupability from the lower ones. Various types of retention and eviction algorithms may be used, including least frequently used (LFU), least recently used (LRU), etc. There may be one large deduplication hash table which holds all entries, and the least frequently or least recently used entry is evicted when there is a new incoming entry to join the deduplication hash table but the deduplication hash table is full. Such algorithms are optimized in some embodiments by splitting the one large deduplication hash table into multiple sub-tables with variable length, with the limitation that the total entries (e.g., the sum of all entries in the sub-tables) should be no larger than total_length. FIG. 7 shows a process flow 700 for a hash entry addition algorithm, and FIG. 8 shows a process flow 800 for a hash entry eviction algorithm. As shown in FIGS. 7 and 8, there is no need to record data blocks' compression ratio in the deduplication hash table—the compression ratio of a data block may only need to be queried when creating an entry and adding it to its corresponding sub-table.

The process flow 700 of FIG. 7 starts in step 701, and in step 703 an incoming new entry is received which has an identifier for a data block x with a compression ratio C[x]. In step 705, a determination is made as to whether sum(L) is less than length_total. If the result of the step 705 determination is no, the cache entry eviction algorithm (e.g., the process flow 800 of FIG. 8) is triggered to evict old entries from the deduplication hash table in step 707. If the result of the step 705 determination is yes, in step 709 a new cache entry is added to the subtable_c[n] which the compression ratio C[x] belongs to, and then the process flow 700 ends in step 711.

The process flow 800 of FIG. 8 starts in step 801, and in step 803 M entries are identified in the deduplication hash table which have the least deduplication possibility: e[m], m={1, 2, . . . , M}. In step 805, for each e[m], m={1, 2, . . . , M}, if e[m] belongs to subtable_c[n] and L[n]≥L[n]$_{optimal}$ then e[m] is evicted from subtable_c[n] and L[n] is updated to L[n]−1. In step 807, a determination is made as to whether sum(L)<length_total. If the result of the step 807 determination is no, the process flow then proceeds to step 809 where the least recently (or frequently) used entry e [1] is evicted and then the process flow 800 ends in step 811. If the result of the step 807 determination is yes, then the process flow 800 ends in step 811.

The optimized hash entry retention and eviction algorithms of FIGS. 7 and 8 utilize variable-length sub-tables, which are divided by leveraging data blocks' compression ratio awareness. Entries with identifiers of lower compression ratio data blocks thus have a higher chance for retention in the deduplication hash table. This helps to save physical space and improve data deduplication efficiency as described in further detail below with respect to FIG. 12.

Figure 9:
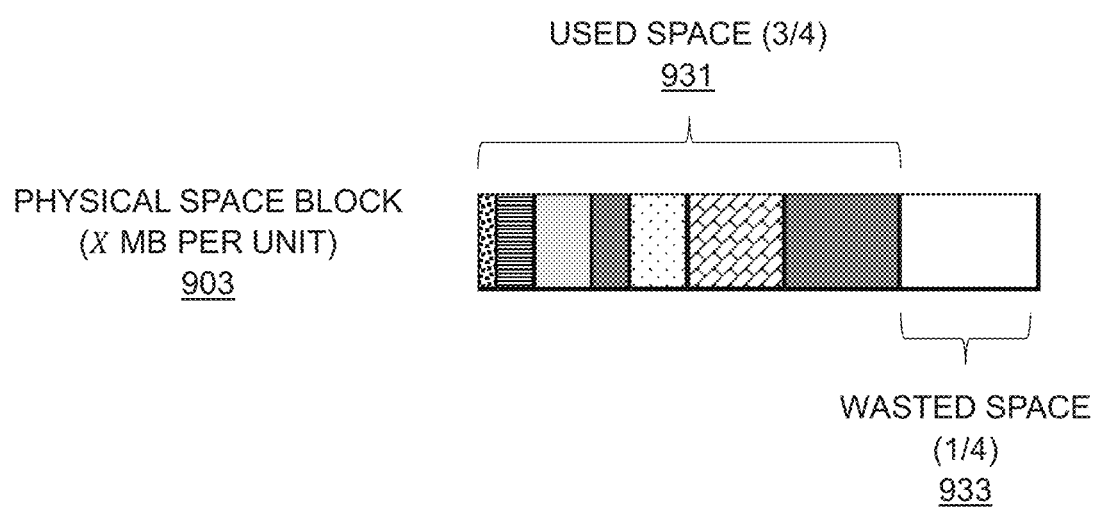
FIG. 9 shows an example of a physical space block with used and unused space portions in an illustrative embodiment.

Optimization of a physical space block selection algorithm with consideration of the technical problem (2) above (e.g., the optimization point of step 602B in the process flow 600 of FIG. 6) will now be described. In the description below, a "data block" is used to denote a chunk of data that is represented by a deduplication hash table entry. A VLB is used to map logical data blocks to physical space, with a maximum total logical data size of X MB. A physical space block is used to denote a physical space unit that is provided by a storage system for storing data with size X MB. PB denotes one set to record physical space blocks that already has up to 8 (e.g., the limit in this example) of VLBs mapped to it, but has more than ⅛ unusable wasted space ratio. ws[i]

is used to denote the wasted space ratio in physical space block i in PB. For example, FIG. 9 shows a physical space block 903 with a used space portion 931 of ¾ and a wasted space portion 933 of ¼ (e.g., the physical space block 903 has ws[i]=¼).

Figure 10:
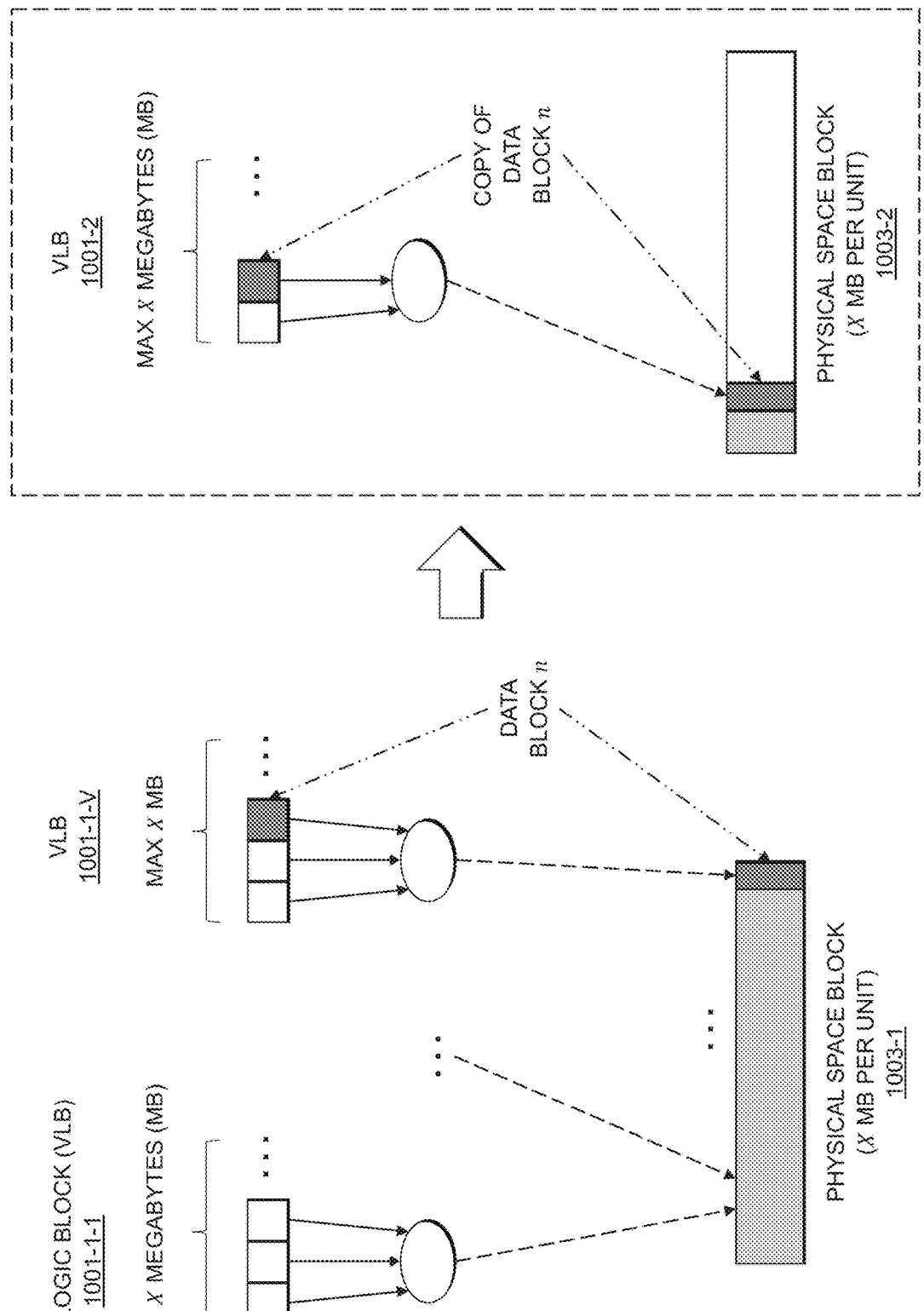
FIG. 10 shows an example of copying of a data block from one physical space block to another when a reference count for the data block exceeds a storage system limit in an illustrative embodiment.

Consider, as an example, a deduplication reference count of a same data block n which reaches a maximum number limit (e.g., 256). When the reference count reaches the limit, the data block n will be copied as a new one and its hash entry is updated to record an identifier of the newly copied data block. FIG. 10 illustrates this example, where a set of VLBs 1001-1-1 through 1001-1-V (collectively, VLBs 1001-1) are mapped to physical space block 1003-1. A particular data block n in VLB 1001-1-V is copied to a new VLB 1001-2 and corresponding physical space block 1003-2 when its deduplication reference count reaches the limit.

Figure 11A:
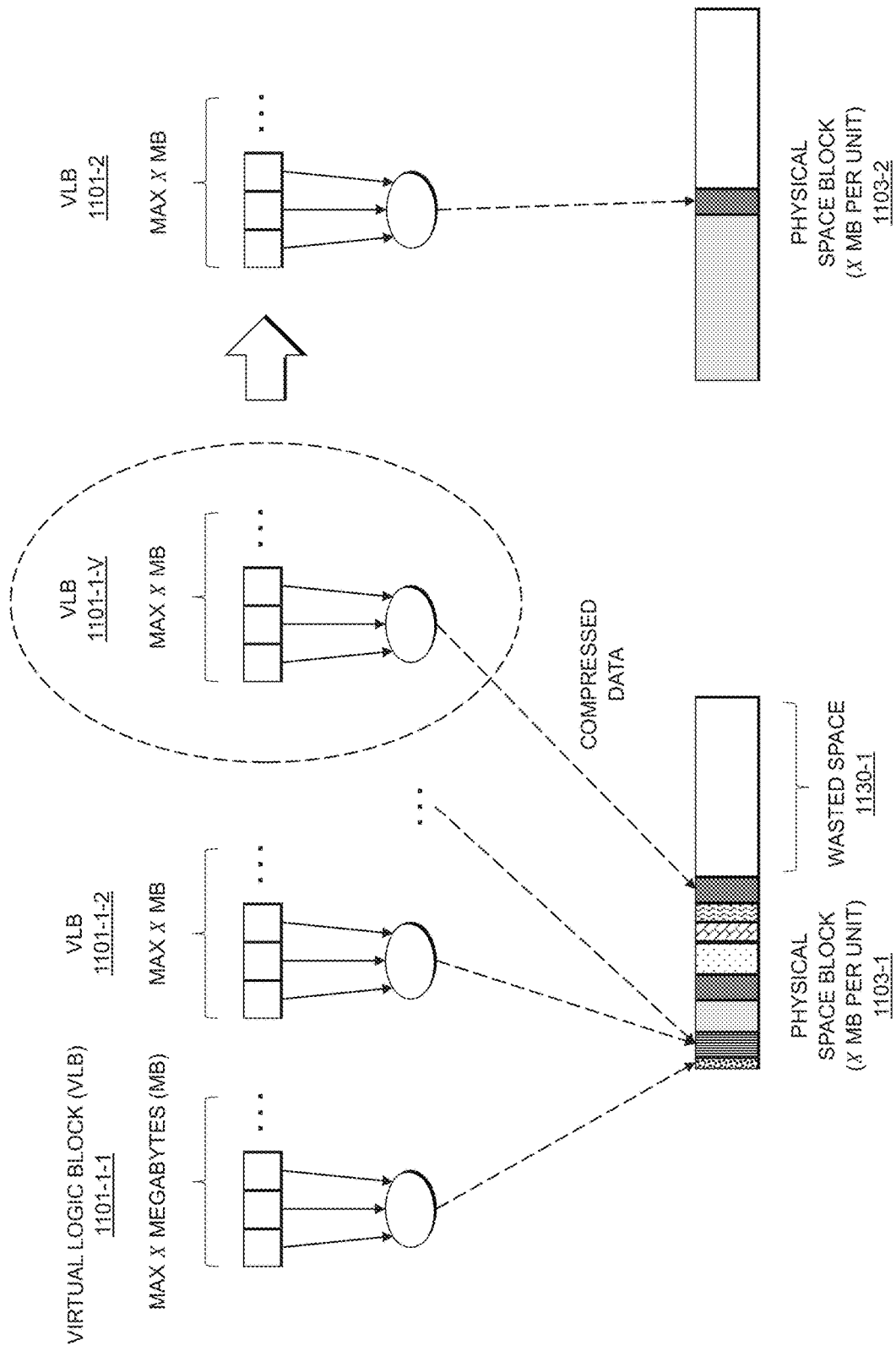
FIGS. 11A and 11B show an example of background data copy operations for reducing wasted space in physical space blocks of a storage system in an illustrative embodiment.
Figure 11B:
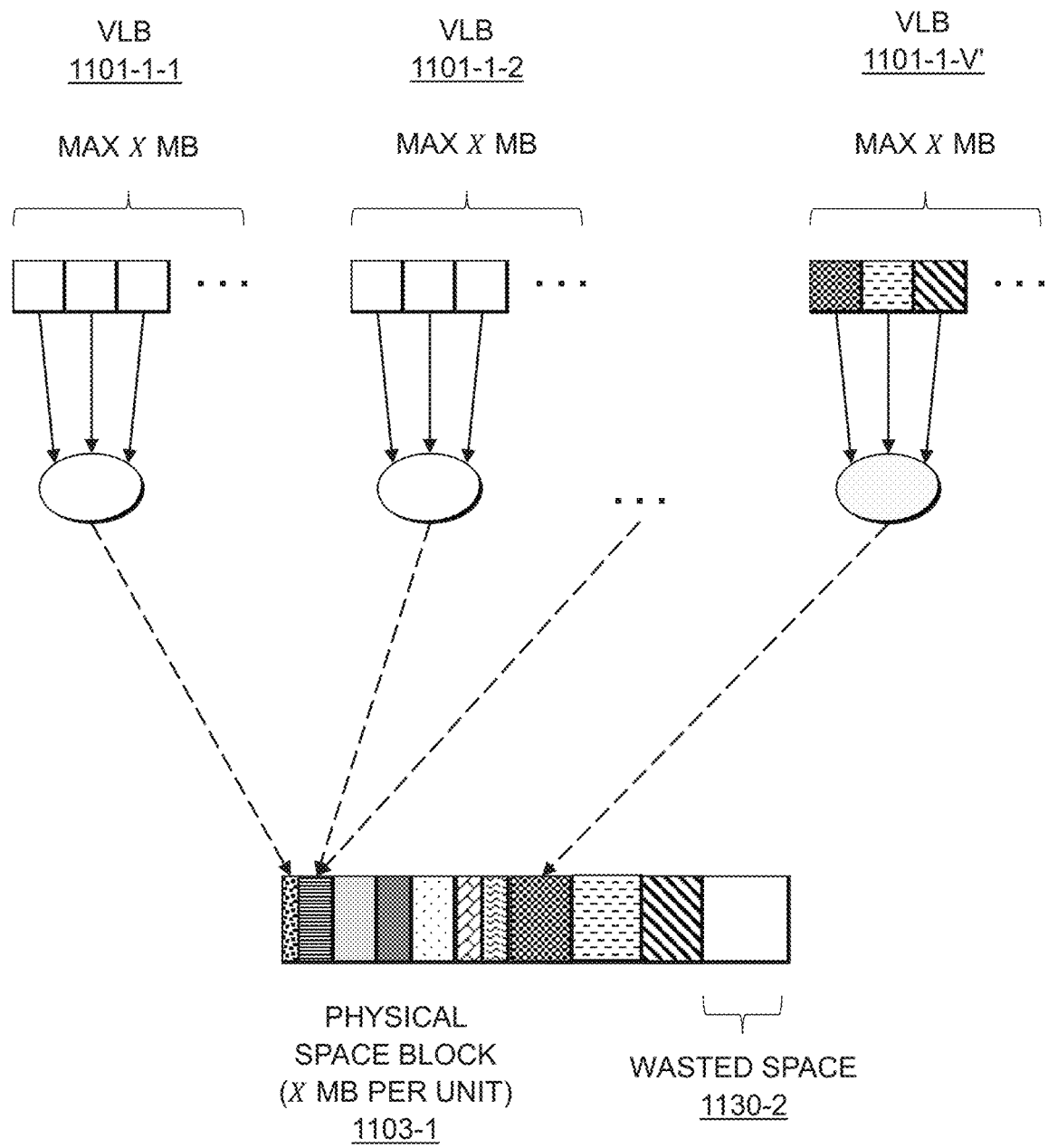

In some embodiments, an algorithm is leveraged to make use of the wasted space in PB to hold low compression ratio copies that are from sub-tables with lower compression ratio levels (e.g., subtable_c[1], subtable_c[2], subtable_c[3], subtable_c[4]). FIGS. 11A and 11B show an example of such an algorithm, where a set of VLBs 1101-1-1, 1101-1-2, . . . , 1101-1-V (collectively, VLBs 1101-1) are mapped to physical space block 1103-1. For the physical space block 1103-1 (PB[i]), one of its corresponding VLBs (VLB 1101-1-V) is moved to another VLB 1101-2 mapped to another physical space block 1103-2. The VLB 1101-1-V and its relationship to physical space block 1103-1 (PB[i]) is then cleared, such that the physical space block 1103-1 (PB[i]) has less than the maximum number of referenced VLBs (e.g., where the maximum number of referenced VLBs, V, may be 8). A new VLB, denoted VLB 1101-1-V is allocated to the physical space block 1103-1 and is used to create mappings from newly copied low compression ratio data blocks to the physical space block 1103-1. This results in improvement (e.g., a reduction) in the wasted space of the physical space block 1103-1 from 1130-1 to 1130-2 as shown in FIGS. 11A and 11B. When the physical space block 1103-1 (PB[i]) can not allocate enough space for new copies, another physical space block 1103-2 (PB[j]) is chosen to allocate space for new copies. One of the original VLBs of the physical space block 1103-2 (PB[j]) may first be migrated as described above.

This optimization can help make full or improved use of physical space in a storage system by allocating lower compression ratio data block copies to previously wasted space. Advantageously, this approach does not impact user write IO performance since it is one background data copy operation, and there might have been more read IO hit on the physical space block since it has more data with higher deduplication possibility level.

An example implementation of the techniques described herein will now be described in further detail with respect to FIG. 12. First, data source preparation is performed. For simplicity and clarity of illustration, 8 kilobyte (KB) granularity data blocks are generated from data set F, where F={f1, f2, f3, . . . , f200} and the compression rate C is randomly chosen from the set {[8:8], [8:6], [8:3], [8:1], [16:1]} corresponding to each type of data blocks. For initialization, the maximum size of the deduplication hash table is set to length_total=100. Thus, the target length of each sub-table is $L[1]_{optimal}=40$, $L[2]_{optimal}=29$, $L[3]_{optimal}=18$, $L[4]_{optimal}=8$, $L[5]_{optimal}=2$. For an incoming deduplication query, the deduplication hash table entries are checked for a match. If there is no matched entry, the data is stored. Otherwise, a reference count is added for the previously-stored data block. Here, the maximum deduplication reference count of a same stored data block is assumed to be 256. Data blocks which reach the reference count limit are copied to consume wasted space of physical data blocks in PB. Deduplication hash table retention and eviction processes are then triggered. At each time interval, new entries to be added to the deduplication hash table are generated and used to trigger an eviction iteration if the deduplication hash table has no room for new entries (e.g., in accordance with the process flows 700 of FIG. 7 and 800 of FIG. 8). With the above, 1 terabyte (TB) of IO writes are emulated, with the results shown in the table 1200 of FIG. 12. As shown in table 1200, use of the optimized methods described herein greatly improve the deduplication efficiency by reducing the physical space consumption with a ratio of about 15%, where:

Physical Space Consumption Reduced Ratio =

$$\frac{100\% * PhysicalSpaceDelta}{\text{Allocated Physical Space (original)}}$$

$PhysicalSpaceDelta =$

Allocated Physical Space (original) − Allocated Physical Space (optimized)

Figure 12:
FIG. 12 shows a table of results of application of optimization of deduplication hash table retention and eviction algorithms as well as optimization of physical space block selection for storage systems in an illustrative embodiment.

In the example of FIG. 12, the deduplication hash table entry eviction algorithm used is LFU, where entries that are used least often are discarded first. The emulation is based on LFU and is used to identify entries with least deduplication possibility and uses variable-length sub-tables divided by leveraging data blocks' compression ratio awareness. In other embodiments, however, LRU or other types of cache evictions algorithms may be used.

The solutions described herein provide various advantages relative to conventional approaches. For example, the solutions described herein take into account the compression characteristics of data blocks, and make use of the compression characteristics impact on deduplication efficiency which reduces the capacity demands for a storage system to store the same amount of data. In addition, the solutions described herein result in less data writing to physical drives, which advantageously reduces wear and can extend the life of the physical drives (e.g., reducing the wear level of flash in SSDs). This provides cost savings, as solid-state storage is expensive. The solutions described herein also help to use less physical capacity, enabling a storage system to serve more user data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for compression ratio-aware data deduplication will now be described in greater detail with reference to FIGS. 13 and 14. Although described in the context of system 100, these platforms may also be used to implement at least portions of other information processing systems in other embodiments.

Figure 13:
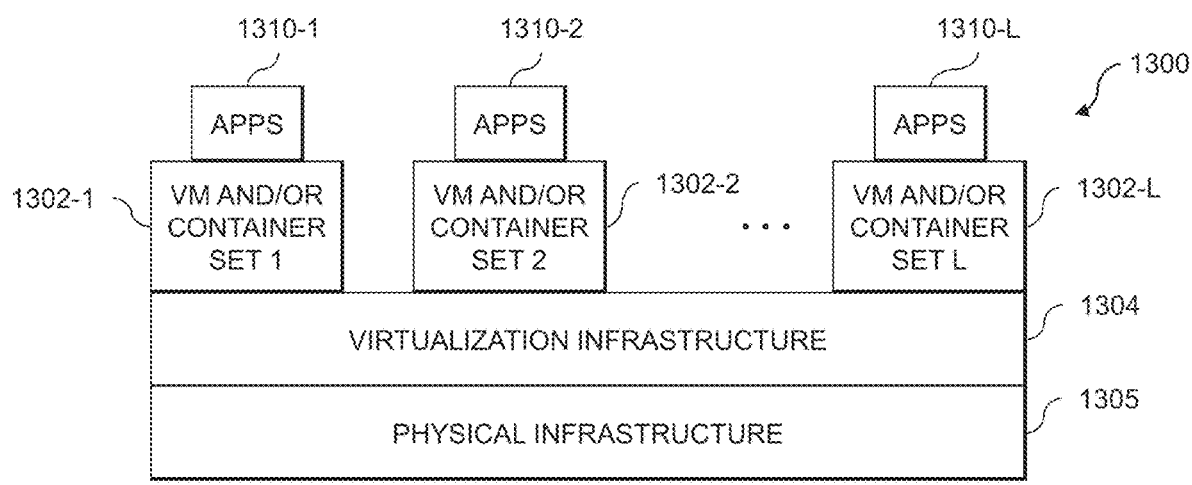
FIGS. 13 and 14 show examples of processing platforms that may be utilized to implement at least a portion of an information processing system in illustrative embodiments.
Figure 14:
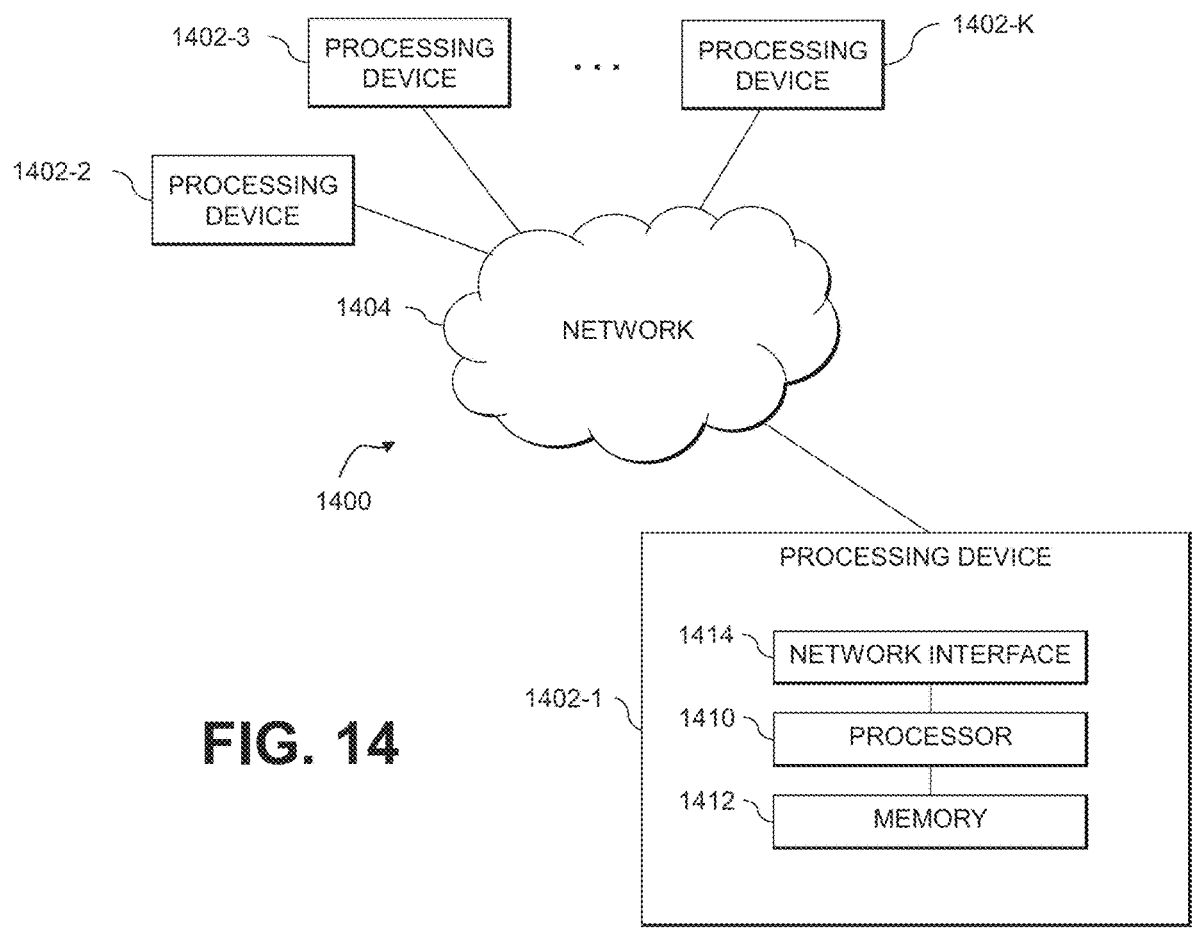

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for compression ratio-aware data deduplication as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
maintaining, for a storage system, a deduplication data structure comprising a target total number of entries for data block identifiers, the deduplication data structure comprising two or more sub-portions associated with different compression ratio ranges, the two or more sub-portions of the deduplication data structure having respective target numbers of entries wherein a sum of the target numbers of entries of the two or more sub-portions of the deduplication data structure is less than or equal to the target total number of entries of the deduplication data structure, the two or more sub-portions of the deduplication data structure comprising a first sub-portion having a first target number of entries for data block identifiers of data blocks having compression ratios in a first compression ratio range and at least a second sub-portion having a second target number of entries for data block identifiers of data blocks having compression ratios in a second compression ratio range, the second target number being different than the first target number, the second compression ratio range being different than the first compression ratio range;
identifying, for a given data block to be stored in the storage system, a given data block identifier and a given compression ratio;
determining whether the given data block identifier of the given data block is in a given one of the two or more sub-portions of the deduplication data structure having a given compression ratio range including the given compression ratio;
responsive to determining that the given data block identifier for the given data block is not in the given sub-portion of the deduplication data structure, (i) writing the given data block to a given one of a plurality of physical space blocks of the storage system, the given physical space block being selected based at least in part on the given compression ratio of the given data block and an amount of unused space in the given physical space block and (ii) determining whether to add the given data block identifier as an entry in the given sub-portion of the deduplication data structure based at least in part on whether a number of allocated entries of the given sub-portion of the deduplication data structure is less than a given target number of entries of the given sub-portion of the deduplication data structure; and
responsive to determining that the given data block identifier for the given data block is in the given sub-portion of the deduplication data structure, incrementing a deduplication reference count for the given data block identifier.

2. The apparatus of claim 1 wherein the deduplication data structure comprises a deduplication hash table, and wherein the data block identifiers comprise hashes of content of data blocks.

3. The apparatus of claim 1 wherein the given target number of entries of the given sub-portion of the deduplication data structure is computed based at least in part on the given compression ratio range associated with the given sub-portion of the deduplication data structure.

4. The apparatus of claim 1 wherein maintaining the deduplication data structure comprises, responsive to receiving a new data block identifier associated with a new data block for addition to the deduplication data structure, determining whether the deduplication data structure has available space for the new data block identifier.

5. The apparatus of claim 4 wherein determining whether the deduplication data structure has available space for the new data block identifier comprises determining whether a sum of allocated entries across the two or more sub-portions of the deduplication data structure is less than the target total number of entries for data block identifiers for the deduplication data structure.

6. The apparatus of claim 4 wherein maintaining the deduplication data structure further comprises, responsive to determining that the deduplication data structure has available space for the new data block identifier:
identifying a compression ratio of the new data block; and
adding the new data block identifier to one of the two or more sub-portions of the deduplication data structure having an associated compression ratio range including the identified compression ratio of the new data block.

7. The apparatus of claim 4 wherein maintaining the deduplication data structure further comprises, responsive to determining that the deduplication data structure does not have available space for the new data block identifier:
evicting one or more existing data block identifiers from the deduplication data structure; and
adding the new data block identifier to one of the two or more sub-portions of the deduplication data structure having an associated compression ratio range including the identified compression ratio of the new data block.

8. The apparatus of claim 7 wherein evicting the one or more existing data block identifiers from the deduplication data structure comprises evicting the one or more existing data block identifiers from ones of the two or more sub-portions of the deduplication data structure having numbers of allocated entries exceeding their associated target numbers of entries.

9. The apparatus of claim 8 wherein evicting the one or more existing data block identifiers from the deduplication data structure comprises evicting the one or more existing data block identifiers from ones of the two or more sub-portions of the deduplication data structure having allocated numbers of entries exceeding their associated target numbers of entries that are one of least recently used and least frequently used.

10. The apparatus of claim 1 wherein the at least one processing device is further configured to perform the step of, responsive to determining that an amount of unused space of the given physical space block exceeds a designated threshold, performing a background data copy operation to reduce the amount of unused space of the given physical space block.

11. The apparatus of claim 10 wherein the storage system comprises a plurality of virtual logical blocks that map logical data blocks to physical space of the plurality of physical space blocks, and wherein the given physical space block is limited to mapping a designated number of the plurality of virtual logical blocks.

12. The apparatus of claim 11 wherein the background data copy operation comprises:
migrating a first one of the plurality of virtual logical blocks currently mapped to the given physical space block to another one of the plurality of physical space blocks; and allocating a second one of the plurality of virtual logical blocks to the given physical space block.

13. The apparatus of claim 12 wherein the first virtual logical block maps a first logical data block having a first compression ratio and the second virtual logical block maps a second logical data block having a second compression ratio.

14. The apparatus of claim 13 wherein the second compression ratio is lower than the first compression ratio.

15. A computer program product comprising a non-transitory processor-readable storage medium having stored therein program code of one or more software programs, wherein the program code when executed by at least one processing device causes the at least one processing device to perform steps of:

maintaining, for a storage system, a deduplication data structure comprising a target total number of entries for data block identifiers, the deduplication data structure comprising two or more sub-portions associated with different compression ratio ranges, the two or more sub-portions of the deduplication data structure having respective target numbers of entries wherein a sum of the target numbers of entries of the two or more sub-portions of the deduplication data structure is less than or equal to the target total number of entries of the deduplication data structure, the two or more sub-portions of the deduplication data structure comprising a first sub-portion having a first target number of entries for data block identifiers of data blocks having compression ratios in a first compression ratio range and at least a second sub-portion having a second target number of entries for data block identifiers of data blocks having compression ratios in a second compression ratio range, the second target number being different than the first target number, the second compression ratio range being different than the first compression ratio range;

identifying, for a given data block to be stored in the storage system, a given data block identifier and a given compression ratio;

determining whether the given data block identifier of the given data block is in a given one of the two or more sub-portions of the deduplication data structure having a given compression ratio range including the given compression ratio;

responsive to determining that the given data block identifier for the given data block is not in the given sub-portion of the deduplication data structure, (i) writing the given data block to a given one of a plurality of physical space blocks of the storage system, the given physical space block being selected based at least in part on the given compression ratio of the given data block and an amount of unused space in the given physical space block and (ii) determining whether to add the given data block identifier as an entry in the given sub-portion of the deduplication data structure based at least in part on whether a number of allocated entries of the given sub-portion of the deduplication data structure is less than a given target number of entries of the given sub-portion of the deduplication data structure; and responsive to determining that the given data block identifier for the given data block is in the given sub-portion of the deduplication data structure, incrementing a deduplication reference count for the given data block identifier.

16. The computer program product of claim 15 wherein the deduplication data structure comprises a deduplication hash table, and wherein the data block identifiers comprise hashes of content of data blocks.

17. The computer program product of claim 15 wherein the given target number of entries of the given sub-portion of the deduplication data structure is computed based at least in part on the given compression ratio range associated with the given sub-portion of the deduplication data structure.

18. A method comprising:

maintaining, for a storage system, a deduplication data structure comprising a target total number of entries for data block identifiers, the deduplication data structure comprising two or more sub-portions associated with different compression ratio ranges, the two or more sub-portions of the deduplication data structure having respective target numbers of entries wherein a sum of the target numbers of entries of the two or more sub-portions of the deduplication data structure is less than or equal to the target total number of entries of the deduplication data structure, the two or more sub-portions of the deduplication data structure comprising a first sub-portion having a first target number of entries for data block identifiers of data blocks having compression ratios in a first compression ratio range and at least a second sub-portion having a second target number of entries for data block identifiers of data blocks having compression ratios in a second compression ratio range, the second target number being different than the first target number, the second compression ratio range being different than the first compression ratio range;

identifying, for a given data block to be stored in the storage system, a given data block identifier and a given compression ratio;

determining whether the given data block identifier of the given data block is in a given one of the two or more sub-portions of the deduplication data structure having a given compression ratio range including the given compression ratio;

responsive to determining that the given data block identifier for the given data block is not in the given sub-portion of the deduplication data structure, (i) writing the given data block to a given one of a plurality of physical space blocks of the storage system, the given physical space block being selected based at least in part on the given compression ratio of the given data block and an amount of unused space in the given physical space block and (ii) determining whether to add the given data block identifier as an entry in the given sub-portion of the deduplication data structure based at least in part on whether a number of allocated entries of the given sub-portion of the deduplication data structure is less than a given target number of entries of the given sub-portion of the deduplication data structure; and responsive to determining that the given data block identifier for the given data block is in the given sub-portion of the deduplication data structure, incrementing a deduplication reference count for the given data block identifier;

wherein the method is performed by at least one processing device comprising a processor coupled to a memory.

19. The method of claim 18 wherein the deduplication data structure comprises a deduplication hash table, and wherein the data block identifiers comprise hashes of content of data blocks.

20. The method of claim 18 wherein the given target number of entries of the given sub-portion of the deduplication data structure is computed based at least in part on the given compression ratio range associated with the given sub-portion of the deduplication data structure.

* * * * *